United States Patent [19]

Fanning et al.

[11] Patent Number: 5,382,286
[45] Date of Patent: Jan. 17, 1995

[54] ACOUSTIC GEL

[75] Inventors: Bryce L. Fanning, Dartmouth; Dennis T. Curran; Clive M. Elson, both of Halifax, all of Canada

[73] Assignee: Her Majesty the Queen in right of Canada as represented by the Minister of National Defence of Her Majesty's Canadian Government, Ottawa, Canada

[21] Appl. No.: 91,297

[22] Filed: Jul. 15, 1993

[30] Foreign Application Priority Data

Jul. 22, 1992 [CA] Canada .................................. 2074424

[51] Int. Cl.$^6$ ........................................... C09D 105/08
[52] U.S. Cl. .................................................... 106/162
[58] Field of Search ........................................ 106/162

[56] References Cited

U.S. PATENT DOCUMENTS 4,336,070  6/1982  Koshugi .............................. 106/162

Primary Examiner—David Brunsman
Attorney, Agent, or Firm—Nixon & Vanderhye

[57] ABSTRACT

A method for reducing cavitation around underwater acoustic projectors is described. The projector is cleaned with a surfactant and then encapsulated with an aqueous gel containing a polysaccharide polymer such as a chitosan derivative, a hydrophilic stabilizer and a biocide.

8 Claims, No Drawings

ACOUSTIC GEL

FIELD OF INVENTION

This invention relates to a method for reducing cavitation around underwater acoustic projectors, and to a composition for use therein,

BACKGROUND OF INVENTION

When underwater acoustic projectors are driven at levels at which peak acoustic pressures exceed the ambient hydrostatic pressure, a phenomenom known as cavitation can occur. This is manifested by bubbles appearing on or near the surface of the projector and by a sudden reduction in the acoustic loading of the device. Acoustic energy cannot be transferred through the gas bubbles created and consequently the projector ceases to radiate the desired acoustic signal. When the acoustic loading of the projector is reduced, catastrophically high vibrations of the projector can occur with resultant damage to the projector. Further, insidious low level cavitation can cause rapid erosion of the projector face. It is, therefore, highly desirable to avoid cavitation whenever possible. Traditionally this has been achieved by operating the projector at depths where the hydrostatic pressure is high enough to prevent cavitation or by enclosing the projector in an acoustically transparent pressurized container. Unfortunately, there are many instances where the operating depth of a projector is dictated by considerations other than cavitation prevention. For example full power operation at shallow depths may be an operational requirement in order to achieve long distance sound propogation. In the case of hull mounted projectors, such as sonar domes and echo sounders, deep operation obviously is not possible. Enclosing the projector is usually impractical or expensive. Containers capable of withstanding the pressure at, say, 100 m (approx. 1000 k Pa) would have to be made from enormously strong materials. Acoustically transparent materials are not generally strong structural materials. There is, therefore, a need for an alternative method to prevent cavitation around an acoustic projector.

OBJECT OF INVENTION

Thus, it is one object of the present invention to provide a method for preventing cavitation around acoustic projectors.

Another object of the invention is to provide a composition of matter suitable for application to acoustic projectors to prevent cavitation.

BRIEF STATEMENT OF INVENTION

By one aspect of this invention there is provided a method for reducing cavitation around an underwater acoustic projector, comprising encapsulating said projector in an aqueous gel comprising a polysaccharide polymer, a hydrophilic stabilizer and a non-gel inhibiting and soluble biocide, and curing said gel around said projector.

By another aspect of this invention there is provided an aqueous polymeric gel for encapsulatiang underwater acoustic projectors, comprising 0.5–1.0% by weight of a polysaccharide polymer cross linked with about 5–25% by weight of a hydrophilic stabilizer selected from the group comprising ethylene glycol and glycerol, 0.024–0.48% by weight of a cross linking agent and containing about 1 ppm of a non-gel inhibiting and gel-soluble biocide.

DETAILED DESCRIPTION OF PREFERRED EMBODIMENT

In order to operate sonar projectors at high power levels in shallow water it has been found that cavitation can be reduced or eliminated if the projector is surrounded by a fluid which is more resistant to cavitation than water. It has been found that the required acoustic properties and equipment adhesion properties are provided by derivatives of Chitosan based gels to which a biocide has been added. Chitosan, a deacetylated chitin, is a proprietary polysaccharide, available from Nova Chem Ltd., Canada and is made from naturally occuring materials such as lobster and crab shells. Preferably the derivative of is an aliphatic substituted derivative such as a carboxyalkyl, and most particularly is N,O-carboxymethylchitosan. The polysaccharide is cross linked with a cross linking agent in an aqueous ethylene glycol solution, preferably containing a biocide. The polysaccharide is generally in the range 0.5–1.0% by weight polymer, preferably about 0.85% by weight. Ethylene glycol should preferably be in the range 5–25% by weight and more preferably 15% by weight. The cross linking agent, such as glyoxal ($C_2H_2O_2$) should be in the range 0.024–0.48% by weight, and preferably about 0.048%. It has been found that aqueous gels containing about 0.85% N,O-carboxymethylchitosan, 15% ethylene glycol, balance substantially water, develop fungal growth when stored in daylight at room temperature over a period of time (2–3 weeks) causing deterioration of the gel. It is, therefore, advisable to incorporate about 1 ppm of a biocide, such as Quaternary Ammonium Salt (QAS) or hexadecyltrimethyl ammonium bromide which are soluble in the gel mixture and which do not inhibit gel formation. Biocides such as Captan ® and Benlate ® are not suitable as they are not soluble in the gel, and sodium metabisulphite is equally unsuitable as it inhibits gel formation. The ethylene glycol serves as a hydrophilic additive to stabilize the gel and minimize the release of water therefrom particularly when the gel is subjected to a series of freeze-thaw cycles. Other hydrophilic stabilizers such as glycerol may also be incorporated. 15% by weight ethylene glycol as the stabilizer is preferred as this reduces the freezing point of the gel to about $-7.1°$ C. which is well below the freezing point of sea water.

Before the gel is applied to the radiating surface of the projector, it is preferable that the surface should be pretreated to ensure maximum wettability and adhesion of the gel. Pretreatment with a surfactant such us Joy ® Tween ® 20, 60 or 80, Agral ®90, Triton N-57, Triton X114, Atsurf 241, Atsurf 249 detergents, increase wettability and gel adhesion depending to some extent upon the nature of the projector face. The preferred surfactant is NAJ which is a blend of equal volumes of 1% polysaccharide polymer in water, 1% Aerosol OT ® solution and 10% Joy ® detergent. Aerosol OT ® is sodium dioctyl sulfosuccinate, and Joy ® detergent is a mixture of saponified fatty acids.

EXAMPLE 1

Acoustic Testing

The cavitation strength of the various gel formulations was determined by means of a resonant system comprising a hollow glass or aluminum sphere filled with the gel being tested, and a piezoelectric driver. A small region of high acoustic pressure was created at the centre of the sphere when the system was driven at one of its resonances. The mechanical Q (fundamental frequency in Hz) of the system was high (generally between 2000 and 3000) and sufficiently high pressures to cause cavitation were possible with moderate input power to the driver. The acoustic pressure at the centre of the gel was indirectly measured by means of a sensor bonded to the exterior surface of the sphere.

A glass or aluminum sphere having a diameter of 25 cm and wall thickness of 0.6 cm was filled with the gel being tested. A piezoelectric driver in contact with the gel drove the system at one of its resonance frequencies. The acoustic pressure at the centre of the gel was determined by measuring the electrical output of the sensor bonded to the sphere. The sensor was previously calibrated by means of a calibrated probe hydrophone situated at the centre of the gel.

The test routine consisted of applying a low drive voltage to the driver and monitoring the output voltage and waveform of sensor. The drive voltage was gradually increased until the onset of cavitation. Cavitation was manifested by a sudden drop in the output voltage of the sensor, a distortion of the waveform of said sensor, and the simultaneous increase of drive voltage of driver. With the glass sphere there was usually visual evidence of cavitation manifested by very small gas bubbles dancing in the central region of the sphere. There was also very definite audible evidence of cavitation.

The initial studies were conducted using the glass sphere. However, since this container was not truly spherical in shape, and the wall thickness was not constant throughout, there was some concern that flexural resonances might be generated that would interfere with the measurements. An accurately machined aluminum sphere was therefore prepared and used for subsequent tests. This also afforded an opportunity to assess the gel when in contact with two different surfaces. The aluminum sphere was pretreated with a coating of QAS and the glass sphere was rinsed with the NAJ mixture referred to above. The spheres were filled with the preferred gels containing 0.85% N,O-carboxymethyl-chitosan polymer, 0.048% cross-linker, 15% ethylene glycol, 1 ppm QAS, and the various parameters were measured from which the cavitation threshold pressure was calculated.

Initial studies showed that the cavitation threshold was greatly influenced by the amount of dissolved air in the gel—the higher the dissolved air content, the lower the cavitation threshold. Various methods of removing the dissolved air were tried including vacuum pump degassing at room temperature, vacuum pump degassing at an elevated temperature, helium sparge followed by vacuum degassing, and oxygen sparge with sulfite treatment. Vacuum pump degassing at elevated temperatures was used in these studies.

The cavitation pressure was monitored over extended periods of time and the results shown in Table 1 are typical of degassed gels (dissolved air content of 2 to 3 percent). Gels having higher dissolved air contents had significantly lower cavitation pressure thresholds; gels not degassed typically had cavitation pressure thresholds that did not increase above 0.8 arm. The increase of threshold pressure with time corresponds with the curing times of the gels. Table 1 also shows that there was no significant difference between the results obtained with the two spheres.

In order to evaluate the effectiveness of the gels as a medium for increasing the operating cavitation level of projectors, the cavitation threshold of water that was not degassed (the medium in which projectors normally operate) was measured in the spheres and found to be approximately 0.5 atm.

TABLE 1

| Cavitation Threshold Pressure of Acoustic Gel | | | | | |
|---|---|---|---|---|---|
| Glass Sphere | | | Aluminum Sphere | | |
| Days | Frequency (Hz) | Cavitation Pressure (atm) | Days | Frequency (Hz) | Cavitation Pressure (atm) |
| 2 | 12,474.1 | 1.2 | 1 | 12,821.2 | 0.7 |
| 5 | 12,451.0 | 1.1 | 2 | 12,824.6 | 1.0 |
| 12 | 12,438.4 | 1.1 | 6 | 12,821.5 | 0.7 |
| 19 | 12,475.4 | 1.7 | 9 | 12,811.6 | 0.9 |
| 26 | 12,495.9 | 2.3 | 13 | 12,815.8 | 2.2 |
| 29 | 12,525.4 | 3.0 | 15 | 12,815.7 | 2.6 |
| 34 | 12,521.6 | 2.9 | 19 | 12,794.3 | 2.9 |
| | | | 22 | 12,792.2 | 3.0 |
| | | | 25 | 12,785.5 | 3.0 |
| | | | 28 | 12,793.5 | 3.0 |
| | | | 32 | 12,797.3 | 3.0 |
| | | | 36 | 12,793.1 | 3.1 |
| | | | 39 | 12,798.5 | 2.8 |
| | | | 42 | 12,805.6 | 3.0 |
| | | | 46 | 12,811.1 | 2.9 |
| | | | 47 | 12,814.5 | 3.0 |
| | | | 48 | 12,822.9 | 3.0 |
| | | | 49 | 12,828.6 | 2.9 |

EXAMPLE 2

Ability of the Gel to Repair Itself After Cavitation

In order to determine if the gel has the ability to repair itself after cavitation, the gel was cavitated continuously for 15 min. A comparison of the cavitation levels immediately before and after the cavitation period showed no change in the cavitation level. This suggests that the gels are either not damaged or are capable of repairing themselves after they have been cavitated for short periods of time. Table 2 shows the cavitation level immediately before and at various times after the test.

TABLE 2

| Cavitation Level of Gel Before and After Cavitation | | |
|---|---|---|
| Time | $f_o$ (Hz) | $P_c$ (atm) |
| Before cavitation | 12,814.5 | 3.0 |
| 0 min after cavitation | 12,813.2 | 3.0 |
| 10 min after cavitation | 12,814.0 | 3.1 |
| 25 min after cavitation | 12,814.2 | 3.0 |
| 180 min after cavitation | 12,816.3 | 3.4 |

EXAMPLE 3

Durability of Gels

The "durability" of the gel was measured after 48 days of storage. The term "durability" is defined as a measure of the performance of a gel subjected to a relatively high power level for a given period of time. The gel was driven for 90 min. at three-quarters of the power required to achieve cavitation. Table 3 shows resonance frequency and cavitation pressure measured at 0, 15, and 930 min. after the durability drive. The cavitation pressure was not affected by the test.

TABLE 3

| Time | Durability Test | |
|---|---|---|
| | $f_o$ (Hz) | $P_c$ (atm) |
| Before test | 12,822.9 | 3.0 |
| 0 minutes after test | 12,822.5 | 3.2 |
| 15 minutes after test | 12,823.4 | 3.1 |
| 930 minutes after test | 12,828.6 | 2.9 |

From the above it can be seen that substantial improvements in cavitation threshold (14–15 dB) relative to aerated water can be achieved by encapsulatiang acoustic projectors with the gels of the present invention. The performance of these gels is not affected by either driving the gel at cavitation for 15 mins. or subjecting the gel to a relatively high acoustic power for 1.5 hours.

We claim:

1. An aqueous polymeric gel for coating underwater acoustic projectors, comprising 0.5–1.0% by weight of a Chitosan Compound cross linked with about 5–25% by weight of a hydrophilic stabilizer selected from the group comprising ethylene glycol and glycerol, and containing about 0.024–0.48% by weight of a cross linking agent and about 1 ppm of a non-gel inhibiting and gel-soluble biocide.

2. A gel as claimed in claim 1 wherein said chitosan compound is N,O-carboxymethylchitosan.

3. A gel as claimed in claim 2 wherein said N,O-carboxymethylchitosan is present in an amount of 0.85% by weight.

4. A gel as claimed in claim 3 wherein said hydrophilic stabilizer comprises ethylene glycol present in an amount of 15% by weight.

5. A gel as claimed in claim 4 wherein said biocide comprises a quaternary ammonium salt.

6. A gel as claimed in claim 11 wherein said cross linking agent is glyoxal.

7. A gel as claimed in claim 6 wherein said cross linking agent is present in an amount of about 0.048% by weight.

8. A gel as claimed in claim 1 wherein said chitosan compound is a carboxymethyl chitosan.

* * * * *